(12) United States Patent
Bharadwaj et al.

(10) Patent No.: US 7,240,342 B1
(45) Date of Patent: Jul. 3, 2007

(54) USER TRANSPARENT CONTINUOUS COMPILATION

(75) Inventors: Jayashankar Bharadwaj, Saratoga, CA (US); Ravi Narayanaswamy, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 200 days.

(21) Appl. No.: 09/608,616

(22) Filed: Jun. 30, 2000

(51) Int. Cl.
*G06F 9/44* (2006.01)

(52) U.S. Cl. .................. 717/158; 717/145; 717/146

(58) Field of Classification Search ........... 717/154, 717/158, 145
See application file for complete search history.

(56) References Cited

U.S. PATENT DOCUMENTS

| | | | |
|---|---|---|---|
| 5,230,050 A * | 7/1993 | Iitsuka et al. | 717/145 |
| 5,815,720 A * | 9/1998 | Buzbee | 717/158 |
| 5,850,554 A | 12/1998 | Carver | |
| 5,894,576 A | 4/1999 | Bharadwaj | |
| 5,966,537 A * | 10/1999 | Ravichandran | 717/158 |
| 5,970,249 A * | 10/1999 | Holzle et al. | 717/153 |
| 6,158,049 A * | 12/2000 | Goodwin et al. | 717/158 |
| 6,170,083 B1 * | 1/2001 | Adl-Tabatabai | 717/158 |
| 6,233,678 B1 * | 5/2001 | Bala | 712/240 |
| 6,351,849 B1 | 2/2002 | Chen | |
| 6,446,258 B1 | 9/2002 | McKinsey et al. | |
| 6,675,380 B1 | 1/2004 | McKinsey et al. | |

OTHER PUBLICATIONS

Joel Auslander et al., "Fast, effective dynamic compilation," May 1996, ACM Press, ACM Special Interest Group on Programming Languages, p. 149-159.*

Brian Grant et al., "Annotation-directed run-time specialization in C," Dec. 1997, ACM Press, ACM Special Interest Group on Programming Languages, p. 163-178.*

Vasanth Bala, et al., "Transparent Dynamic Optimization," Jun. 1999, Hewlett-Packard Co., HPL-1999-77, pp. i, 1-17.*

Michael G. Burke, et al., "Jalapeño Dynamic Optimizing Compiler for Java™," Jun. 1999, Proceedings of the ACM 1999 conference on Java Grande, pp. 129-141.*

Michael Cierniak, et al., "Practicing JUDO: Java™ Under Dynamic Optimizations," May 2000, ACM SIGPLAN Notices, Proc. of the ACM SIGPLAN 2000 conference on Programming language design and implementation, vol. 35, Issue 5, pp. 13-26.*

Thomas Kistler, "Continuous Program Optimization," 1999, Ph.D. thesis, Department of Information and Computer Science, University of California, Irvine, CA 92697-3425, pp. 1-151.*

Chandra Krintz, et al., "Reducing the Overhead of Dynamic Compilation," Mar. 2000, University of California, San Diego, UCSD Technical Report CSE2000-0648, pp. 1-19.*

Michael P. Plezbert, "Continuous Compilation for Software Development and Mobile Computing," May 1996, M.S. thesis, Washington University, Sever Institute of Technology, Dept. of Computer Science, St. Louis, Missouri, pp. i-vii, 1-75.*

(Continued)

*Primary Examiner*—Tuan Dam
*Assistant Examiner*—Eric B. Kiss
(74) *Attorney, Agent, or Firm*—Blakely, Sokoloff, Taylor & Zafman LLP

(57) ABSTRACT

According to one embodiment, systems, apparatus and methods are disclosed for installing a program onto a target machine, executing the program, and responsive to a change in profile data collected while the program executes which exceeds a predetermined threshold, recompiling the program while the target machine is idle.

21 Claims, 14 Drawing Sheets

OTHER PUBLICATIONS

"COMPAQ Continuous Profiling Infrastructure," [Retrieved on May 8, 2003]. Retrieved from the Internet URL: <http://research.compaq.com/SRC/dcpi/documentation.html> 6 pages.

Hookway, et al., "DIGITAL FX!32: Combining Emulation and Binary Translation," *Digital Technical Journal*, vol. 9, No. 1, 1997, pp. 3-12. Retrieved from the Internet URL: <http://research/compaq.com/wrl/DECarchives/DTJ/DTJP01/DTJP01PF.PDF>.

* cited by examiner

USER TRANSPARENT CONTINUOUS COMPILATION

FIELD OF THE INVENTION

This invention relates to compilers in general, and more specifically to a transparent continuous compiler that provides an optimization of a software application customized to a user's system and usage.

BACKGROUND OF THE INVENTION

Most often, software does not make the best use of the hardware on which it runs. This is due to many reasons. For one, most compiler optimizations are machine dependent. When generating an executable for general distribution software vendors must make decisions about what kind of machine the user is likely to be using. A vendor may choose to optimize his code for the newest processor available while another may opt for another approach. Beside the processor type, other elements of the users system such as the cache size and bus speed affect how the machine performs and therefore relate to how code should be optimized to best perform on that system. Additionally, a user's hardware configuration may change over time due to hardware upgrades. This further complicates the choices to be made in generating optimized code.

Another factor effecting how software should best be optimized is the manner in which the software will be used. That is, the functions utilized and the data set upon which the program operates effects how the code should be optimized. Again, software vendors are left with the task of determining the most likely uses and type of data set that will be used. As with optimizations directed to specific hardware, these choices to not optimum for all possible users of the software.

To generate an optimized executable, software vendors can utilize profile guided optimization. Historically, profile guided optimization in the compiler has been done by inserting instrumentation into the code to be optimized, compiling the code and then executing the instrumented code on a representative machine with a representative data set. The instrumentation provides feedback that allows the software vendor to make adjustments to the code to reach optimum performance on the test machine. Current systems to enable profile collection and usage in the compiler are tedious and consequently usage of profile feedback among software vendors is very low. A software vendor may not have access to representative program inputs. As explained above, the software vendor usually has to choose a single target machine configuration when optimizing the binary that is shipped. This choice is often non-optimal. Hence, to generate a high performance executable, knowledge of accurate usage profiles and the target machine is imperative. Ideally code should be optimized for an individual user and allow for changes over time due to hardware upgrades and changes in usage.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Figure 1:
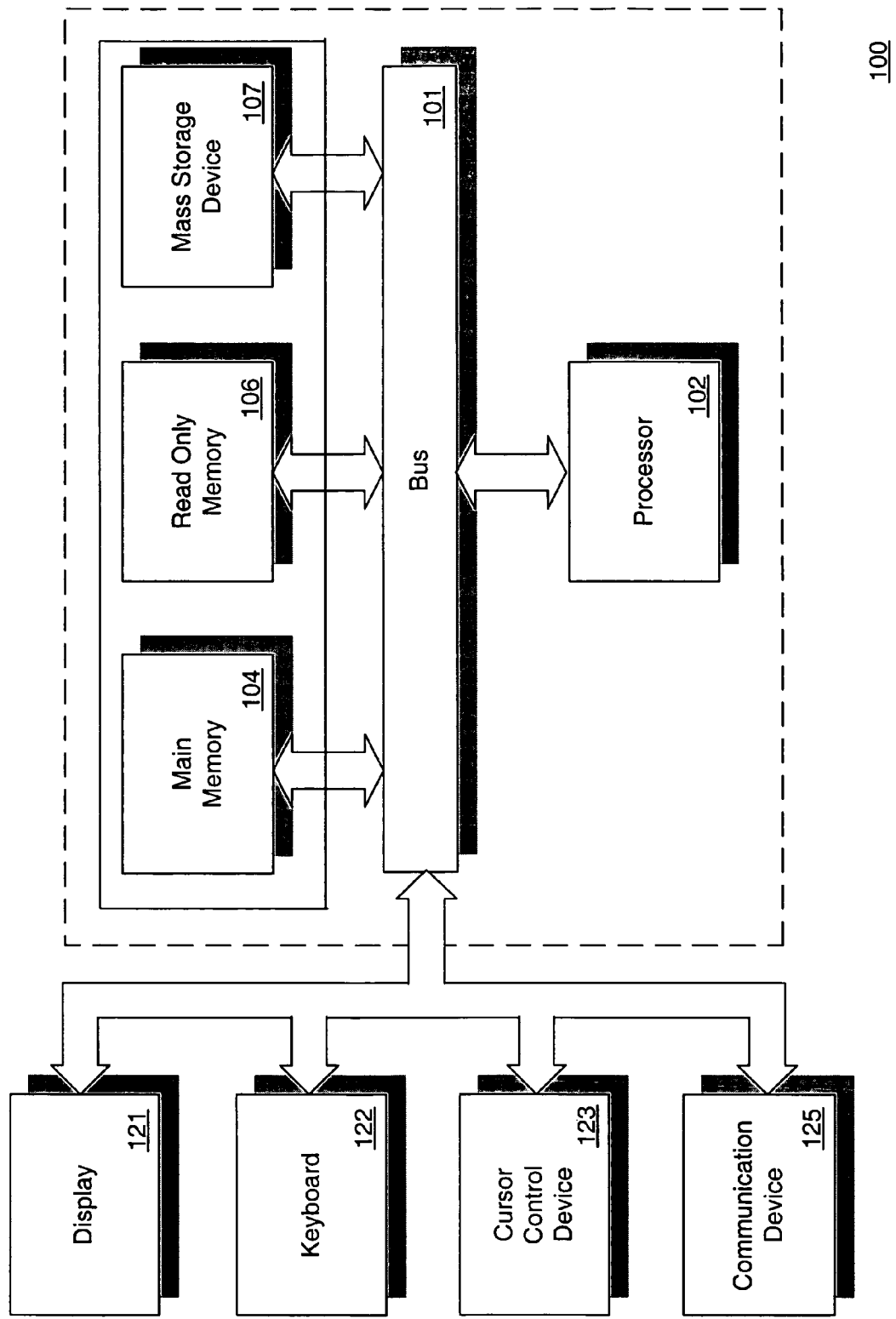
FIG. 1 is a block diagram of a typical computer system upon which one embodiment of the present invention may be implemented.

FIG. 1 is a block diagram of a typical computer system upon which one embodiment of the present invention may be implemented. Computer system 100 comprises a bus or other communication means 101 for communicating information, and a processing means such as processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102.

A data storage device 107 such as a magnetic disk or optical disc and its corresponding drive may also be coupled to computer system 100 for storing information and instructions. Computer system 100 can also be coupled via bus 101 to a display device 121, such as a cathode ray tube (CRT) or Liquid Crystal Display (LCD), for displaying information to an end user. Typically, an alphanumeric input device 122, including alphanumeric and other keys, may be coupled to bus 101 for communicating information and/or command selections to processor 102. Another type of user input device is cursor control 123, such as a mouse, a trackball, or cursor direction keys for communicating direction information and command selections to processor 102 and for controlling cursor movement on display 121.

A communication device 125 is also coupled to bus 101. The communication device 125 may include a modem, a network interface card, or other well known interface devices, such as those used for coupling to Ethernet, token ring, or other types of physical attachment for purposes of providing a communication link to support a local or wide area network, for example. In this manner, the computer system 100 may be coupled to a number of clients and/or servers via a conventional network infrastructure, such as a company's Intranet and/or the Internet, for example.

It is appreciated that a lesser or more equipped computer system than the example described above may be desirable for certain implementations. Therefore, the configuration of computer system 100 will vary from implementation to implementation depending upon numerous factors, such as price constraints, performance requirements, technological improvements, and/or other circumstances.

It should be noted that, while the steps described herein may be performed under the control of a programmed processor, such as processor 102, in alternative embodiments, the steps may be fully or partially implemented by any programmable or hardcoded logic, such as Field Programmable Gate Arrays (FPGAs), TTL logic, or Application Specific Integrated Circuits (ASICs), for example. Additionally, the method of the present invention may be performed by any combination of programmed general purpose computer components and/or custom hardware components. Therefore, nothing disclosed herein should be construed as limiting the present invention to a particular embodiment wherein the recited steps are performed by a specific combination of hardware components.

As described above, the software vendor usually has to choose a single target machine configuration when optimizing the binary that is shipped. This choice is often non-optimal. Hence, to generate a high performance executable, accurate profiles of usage and the target machine are imperative. Ideally code should be optimized for an individual user and allow for changes over time due to hardware upgrades and changes in usage. One solution is to distribute the program in an intermediate level representation which can be read by a variety of machines along with a continuous compiler and a runtime monitor which will be used for generating a customized executable, optimized for the user's machine.

Figure 2:
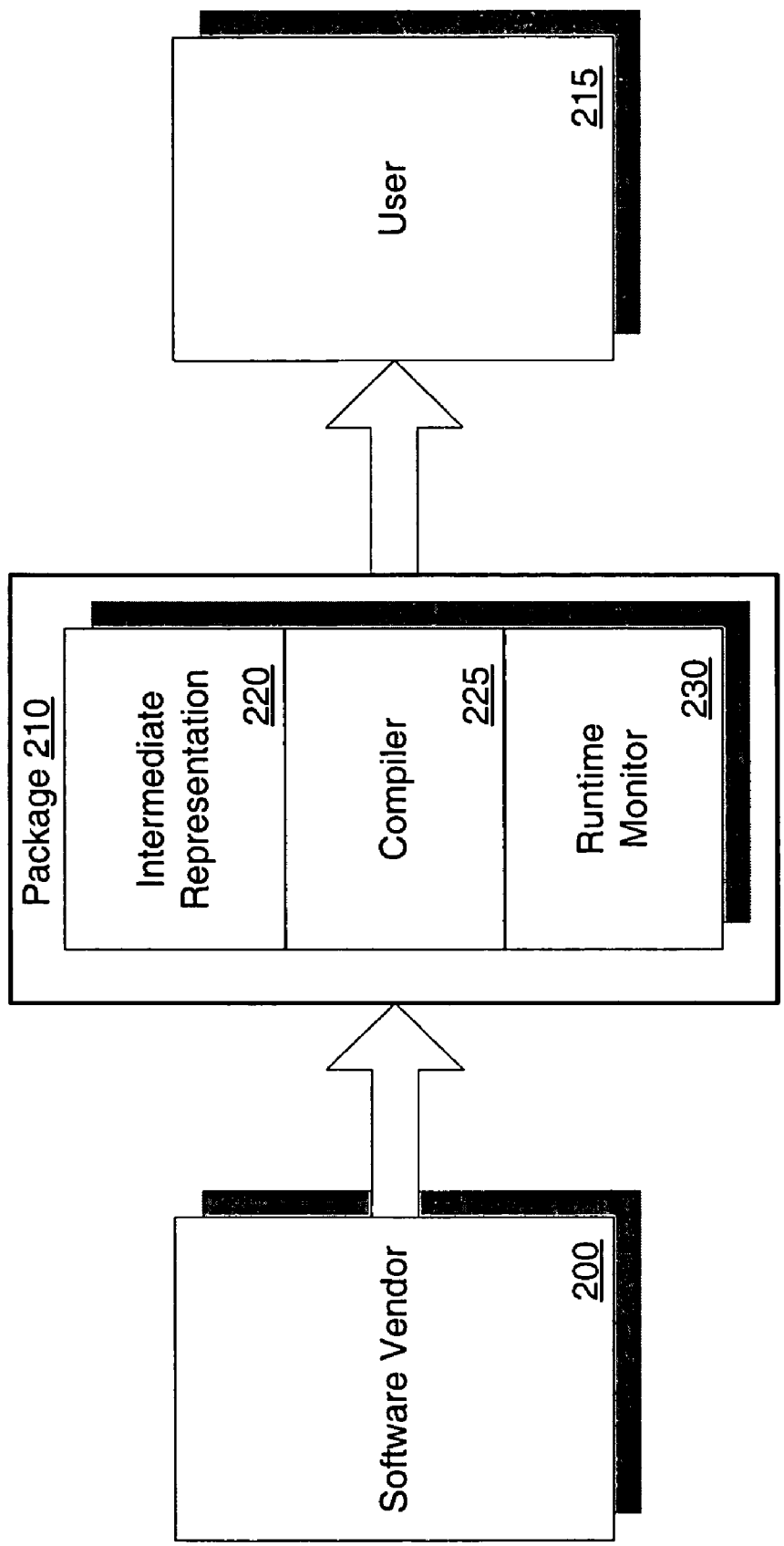
FIG. 2 is a block diagram illustrating distribution of a software product according to one embodiment of the present invention.

FIG. 2 is a block diagram illustrating distribution of a software product according to one embodiment of the present invention. According to this embodiment, the software vendor 200 will distribute to the user 215 a package 210 consisting of several parts 220–230. The package 210 includes an intermediate representation (IR) 220 of the application, a continuous compiler 225, and a runtime monitor 230. The intermediate representation 220 is a binary representation of the original source generated by the software vendor that can be read by the continuous compiler on the user's machine. The compiler 225 and runtime monitor 230 are used during compilation and execution of an executable generated from the intermediate representation 220. These elements will be described in greater detail below.

In alternative embodiments it is contemplated that the software vendor may distribute only an intermediate representation 220 of the source code. The compiler 225 and runtime monitor 230 may be distributed separately. In another embodiment, the compiler 225 and runtime monitor 230 may be part of an operating system.

To generate an intermediate representation, the compiler is broken into two parts, a front end used by the software vendor that takes high level source code as input and produces a high level intermediate representation of the program, and a back-end or continuous compiler run on the user's machine that takes IR files and a profile database, if available, as input and produces objects or executables. The continuous compiler also attaches annotations to the IR files as described below. Generic, non-user specific compiler optimizations can be made by the front-end by the software vendor and all the profile dependant and machine dependant optimizations are part of the continuous compiler. After successful validation, the software vendor would distribute the high level intermediate representation of the program.

Figure 3:
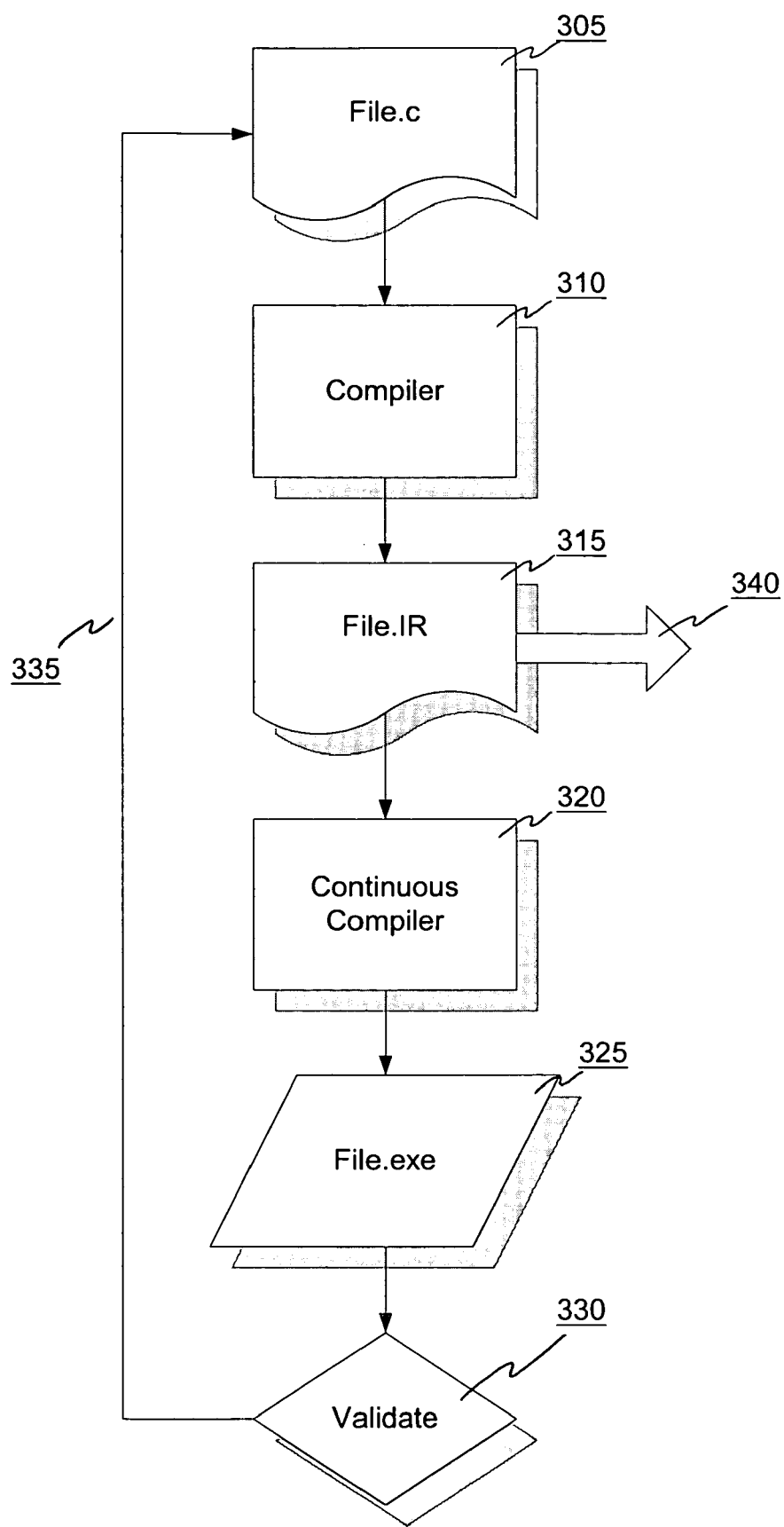
FIG. 3 is a block diagram illustrating generation of a software product according to one embodiment of the present invention.

FIG. 3 is a block diagram illustrating generation of a software product according to one embodiment of the present invention. Such a process could be implemented by software vendors distributing software packages suitable for use by various embodiments of the present invention. A source code file 305 written in a high level language such as C is transformed by a compiler 310 into an intermediate representation file 315. This compiler 310 also generates and inserts annotations into the intermediate representation 315. The purpose and function of these annotations will be described in greater detail below. The intermediate representation 315 is then transformed into an executable binary 325 by a continuous compiler 320 similar to the one that will be installed on the users machine.

This executable binary 325 can then be validated 330. The validation process 330 can provide feedback 335 which can be used to modify the source code 305.

The continuous compiler generates a lot of extra code in the executable to perform many safety tests. These tests can include checks for use of uninitialized variables, checks for bad pointers before dereferences, array bounds checks prior to making array references, etc. After validation, the source code 305 can then be debugged and optimized and recompiled 310 to generate a new intermediate representation 315 which can then be distributed to users 340. In this manner a high quality, debugged intermediate representation of the original source code can be distributed that includes some generic optimizations. Further user specific optimizations will be made on the user's machine.

Figure 4:
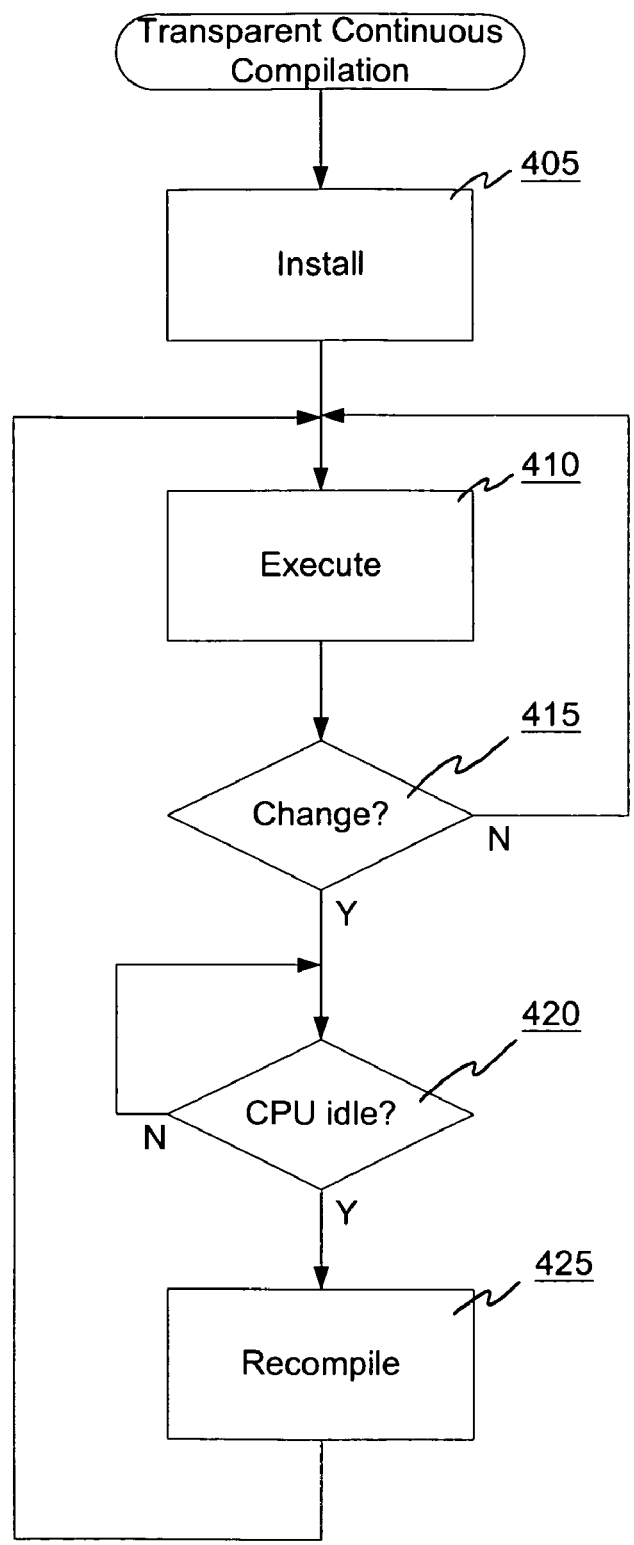
FIG. 4 is a flowchart illustrating a high level overview of transparent continuous compilation according to one embodiment of the present invention.

FIG. 4 is a flowchart illustrating a high level overview of transparent continuous compilation according to one embodiment of the present invention. This process would be performed on the user's machine after distribution of the software package generated as described above. Several steps are described in general terms with reference to this figure. These steps, such as installing, executing, and recompiling, will be described in greater detail below with reference to FIGS. 5–7.

After the software package has been installed 405, the newly generated executable can be run 410. The performance of the executable on the user's machine is monitored 410 profile data is generated. This profile data is compared to past profile data 415. If the profile data has changed in an amount greater than a predetermined threshold amount 415, the system will wait for the CPU to become idle 420. Once the user's machine becomes idle 420, the intermediate representation can be recompiled 425 using the newly generated profile data to optimize the executable.

Figure 5:
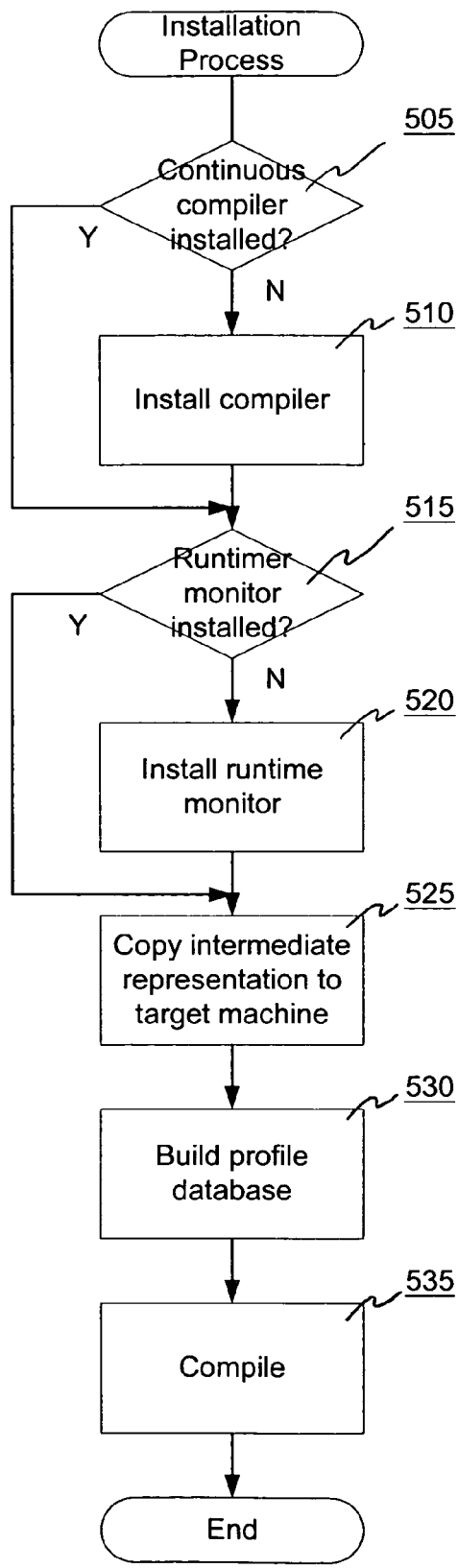
FIG. 5 is a flowchart illustrating an installation process according to one embodiment of the present invention.

FIG. 5 is a flowchart illustrating an installation process according to one embodiment of the present invention. Assuming a continuous compiler and runtime monitor are distributed with the software package as indicated in FIG. 2, the installation process first checks if a continuous compiler has already been installed 505. If no compiler has yet been installed 505, a compiler is then installed on the user's machine 510. Similarly, if no runtime monitor has yet been installed 515, a runtime monitor is installed on the user's machine 520. The intermediate representation of the software is copied to the target machine 525. Next, a profile database is build for the user's machine 530. This initial profile database includes details of the hardware configuration of the users machine. The intermediate representation can then be compiled 535 using the profile database to generate a customized executable for the user's machine. The details of this compilation are substantially similar to those of the recompilation described with reference to FIG. 7 below.

In alternative embodiments of the present invention, the continuous compiler and run time monitor may be distributed separate from applications or may be part of an operating system. In such case, the only functions which need to be performed are to copy the intermediate representation to the target machine 525, build an initial profile database or read an existing profile database 530, and compile the intermediate representation 535.

Figure 6:
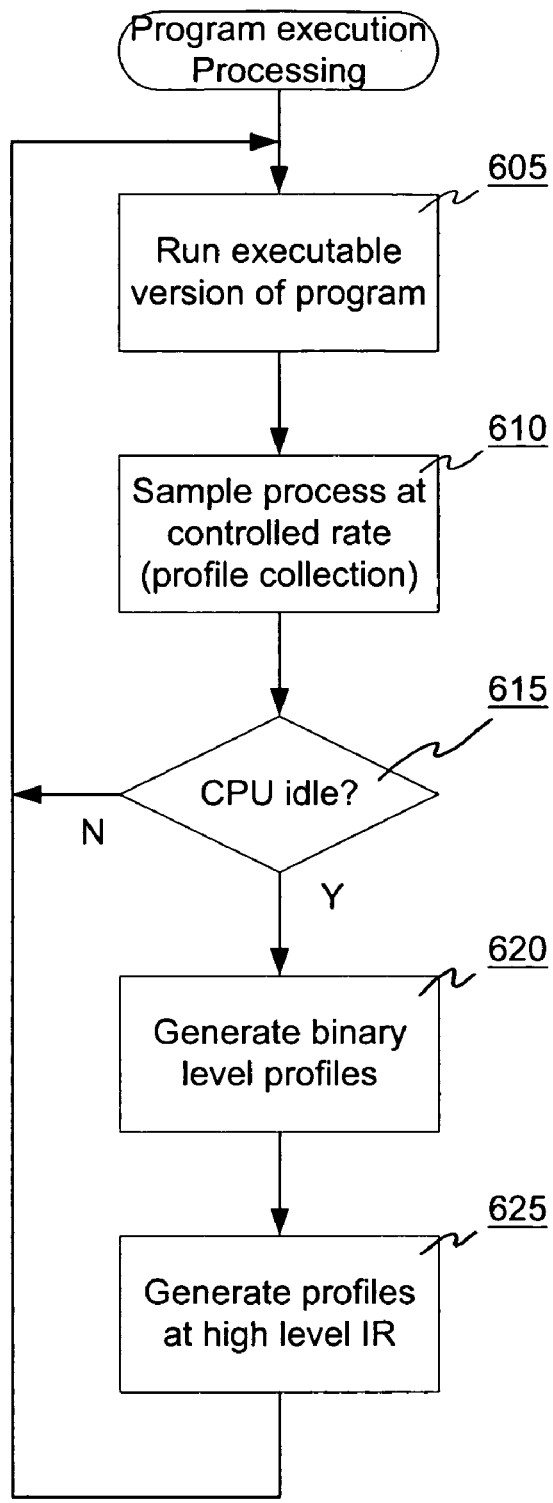
FIG. 6 is a flowchart illustrating program execution processing according to one embodiment of the present invention.

FIG. 6 is a flowchart illustrating program execution processing according to one embodiment of the present invention. First, the executable version of the application program is started 605. While the executable is running, the process is sampled at a controlled interval 610. That is, profile data is collected. While the CPU is busy 615, execution of the application program and profile collection continues. When the CPU becomes idle 615, binary level profiles 620 and high level intermediate representation profiles are generated 625.

Figure 7:
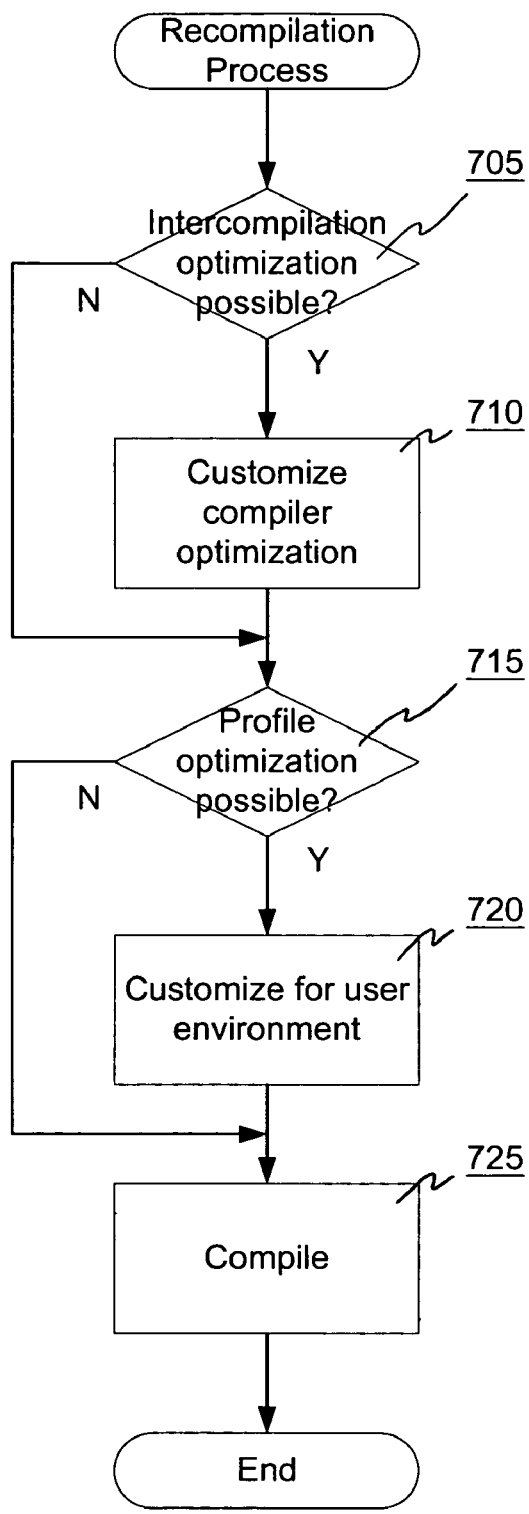
FIG. 7 is a flowchart illustrating a recompilation process according to one embodiment of the present invention.

FIG. 7 is a flowchart illustrating a recompilation process according to one embodiment of the present invention. If inter-compilation optimization is possible 705, the compiler optimizations are customized 710. These customizations can include loop unrolling, pipelining, function in-lining etc. If profile optimization is possible 715, customizations for the user's environment are made 720. These customizations can include preloading data to avoid cache misses, branch prediction adjustments etc. Finally, once all customizations have been made, the intermediate representation is again compiled 725 thereby generating a new executable which is customized to the current configuration and usage of the user's hardware and application.

Figure 8:
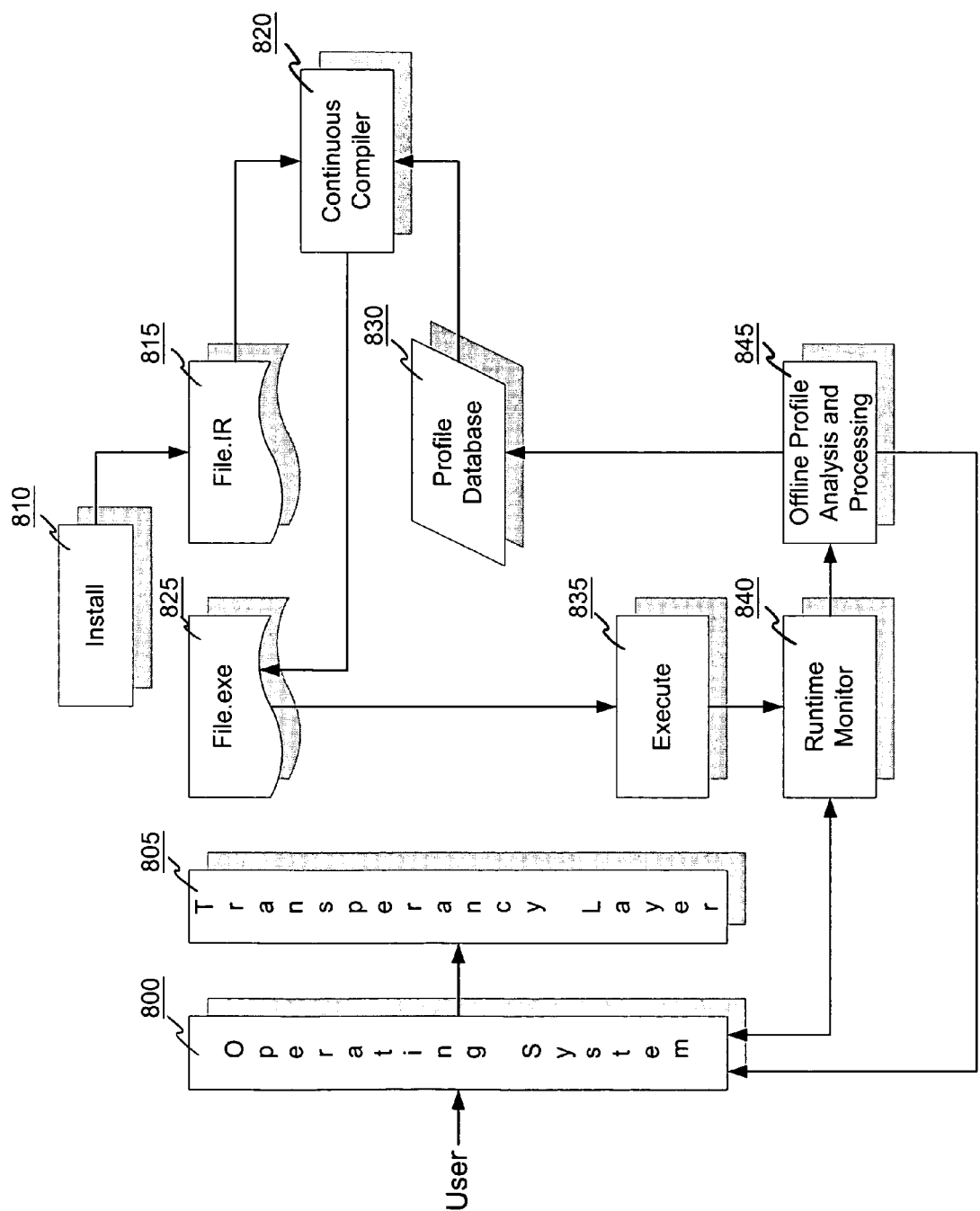
FIG. 8 is a block diagram illustrating a system for transparent continuous compilation according to one embodiment of the present invention.

FIG. 8 is a block diagram illustrating a system for transparent continuous compilation according to one embodiment of the present invention. As explained previously, an installation process 810 copies an intermediate representation (IR) 815 to the target machine. This installation process may also copy a continuous compiler 820 and a runtime monitor 840 to the machine. Alternatively, the continuous compiler 820 and runtime monitor 840 may already be part of the operating system 800. Installation 810 also generates an initial profile database 830 containing information about the user's hardware configuration. The continuous compiler 820 uses the intermediate representation and profile database 830 to generate an executable version 825 of the intermediate representation 815. When the executable 825 is run 835 the runtime monitor 840 collects information from the hardware and operating system 800 for offline profile analysis 845. The offline profile analysis 845 generates data for the profile database 830. If the data being stored in the profile database 830 shows a change from the previous conditions that exceeds a predetermined threshold, recompilation is triggered. When the CPU next becomes idle, the continuous compiler 820 again uses the intermediate representation 815 and profile database 830 to generate an executable 825 that is now customized to the current profile data 830. The transparency layer 805 allows the user, through the operating system 800, to interact with the current version of the executable 825 without needing to keep track of recompilations.

Software installation would trigger an initial compilation of this IR by the continuous compiler for the observed target microprocessor platform at the user site. As the user uses the program, information is collected on its run-time characteristics. These include characteristics of the machine such as processor type and cache configuration so that we may detect changes due to machine upgrades etc. Hardware performance monitors are sampled to derive binary level program profiles. Profile collection is done by sampling the execution of the user's process at a controlled rate so that the runtime overhead to the user process is not noticeable (1–2%). Collected samples are processed during CPU idle time in two steps: 1) generation of binary level profiles, from analysis of the collected samples, and annotations generated in the compilation process for flow graph construction and other purposes; and 2) derivation of profiles at the high level intermediate language used for recompilation, from the binary level profiles generated in step 1.

In order to perform optimizations of an executable, it is necessary to be able to relate locations in the executable to the profile database and the intermediate representation. To do so, the present invention uses annotations. Information on branches, on the number of times a block is executed, and on loads causing cache misses is required. In order to collect this information, tag instructions are placed in the code. These tags allow unique identification of instructions through the compiler and analyzer. Additional information is placed in these tags to form the annotations.

These annotation map each binary level instruction to a source level token, and also describe how the binary level instruction evolved from its corresponding high level instruction in the prior compilation. Using these annotations we can synthesize the IR profiles from binary level profiles. Also, in subsequent recompilation when an IR instruction is broken into multiple instructions either through lowering or optimization we can apportion these profiles appropriately between derived operations. For example, a branch that is duplicated through unrolling may have different probabilities and mispredict rates on the duplicated instructions. If this information was captured in the binary level profiles we can use it to reconstruct this information.

Another novel aspect of the annotation feedback scheme enables communication between phases of the compiler across compilations. This helps reduce phase ordering problems in the compiler. Annotations are used to record events or other relevant information by optimization phases during a compilation. In subsequent compilations these annotations may be consumed by the same or other optimization phases.

Figure 9:
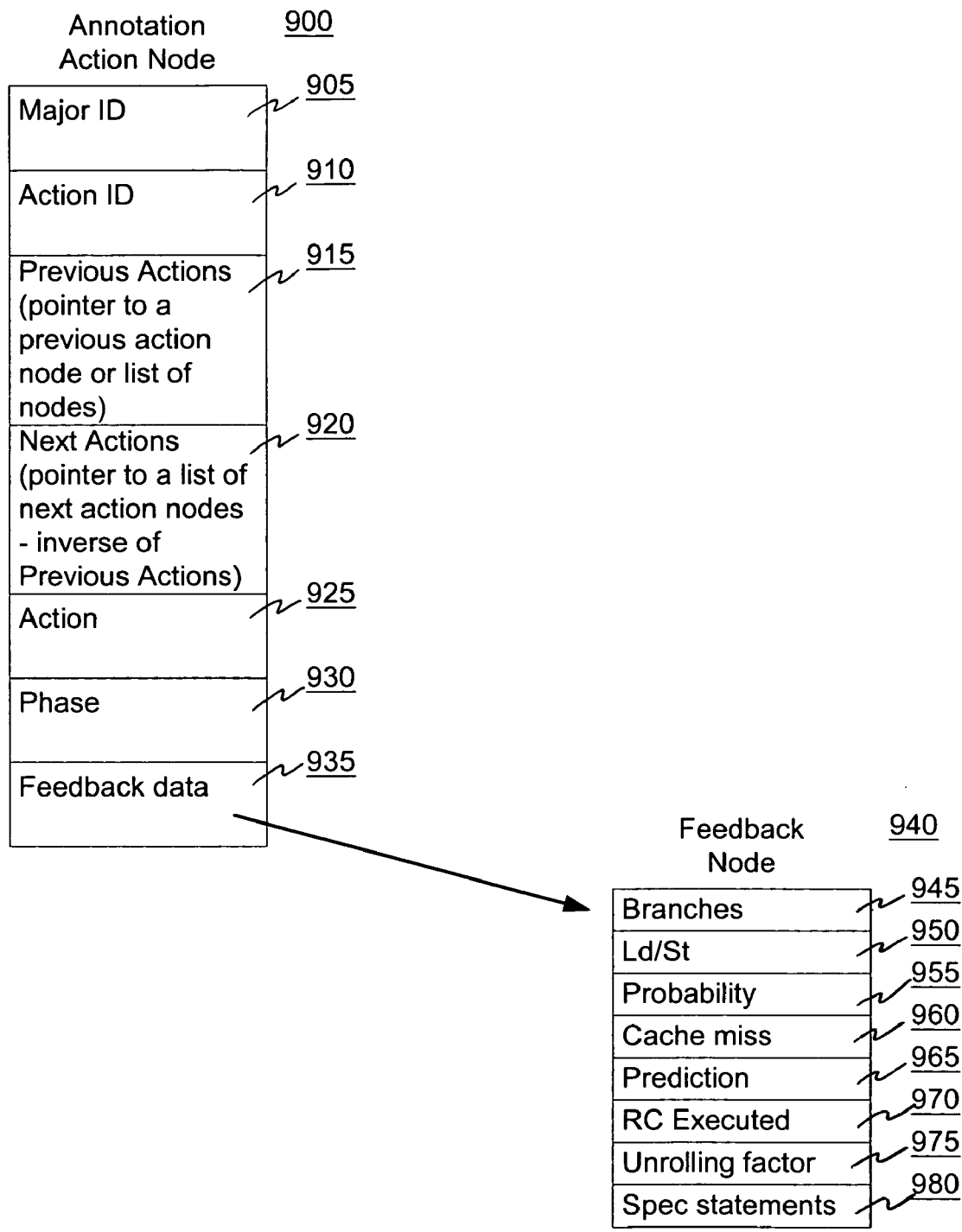
FIG. 9 is a block diagram illustrating a compiler annotation according to one embodiment of the present invention.

FIG. 9 is a block diagram illustrating a compiler annotation according to one embodiment of the present invention. As indicated, the annotation ar action node 900 contains several pieces of data. First is a major ID 905. This major ID 905 is made up of information based on the source file, line and column number. The action ID 910 is a unique ID to capture a particular action on a particular instruction. The previous actions 915 and next actions 920 are pointers to the previous and next action nodes in the list. Actions 925 is an indication of the action that is represented by this node. For example, DELETED, CREATED, etc. Phase 930 refers to the compiler optimization phase in which the node was created. Feedback data 935 includes data collected during program execution. This data can include number of branches 945, load/store information 950, branch probability 955, cache miss indication 960, predictions 965 RC execution 970, unrolling factor 975, and spec statements 980.

According to one embodiment, annotations may variably relate to linked lists of data structures. Handling of such linked lists is routine in the art and is described with reference to FIGS. 10–14 as it relates to annotations.

Figure 10:
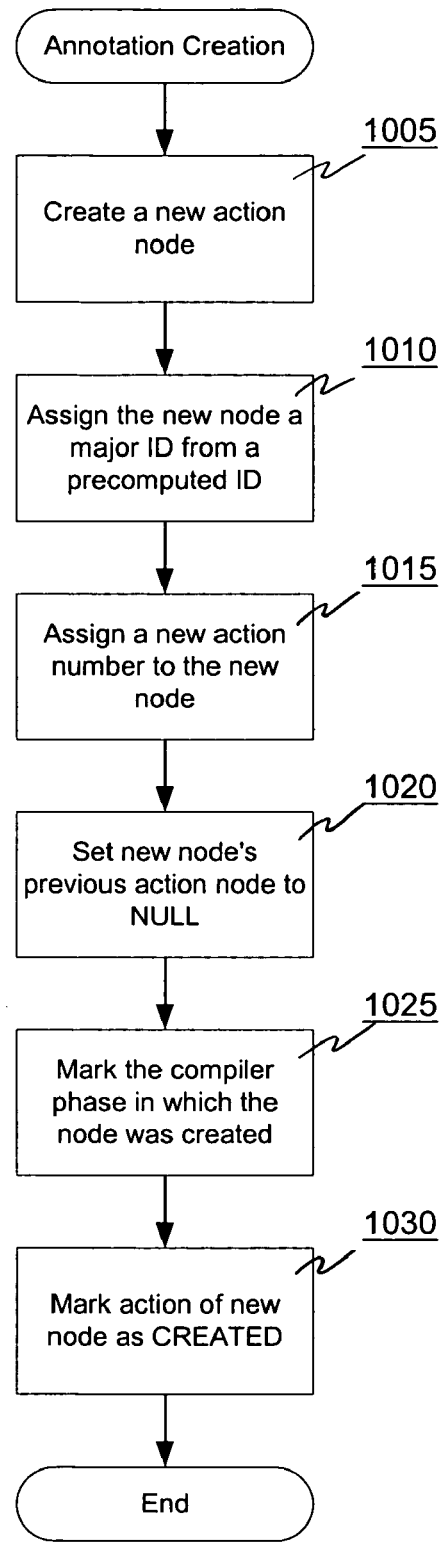
FIG. 10 is a flow chart illustrated annotation creation according to one embodiment of the present invention.

FIG. 10 is a flow chart illustrated annotation creation according to one embodiment of the present invention. First a new action node is created 1005. The new action node is assigned a major ID from a precomputed ID 1010. Next, a new action number is assigned to the new node 1015. The new nodes previous action pointer is set to NULL 1020 and the compiler phase in which the node was created is marked 1025. Finally, the action is marked as CREATED 1030.

Figure 11:
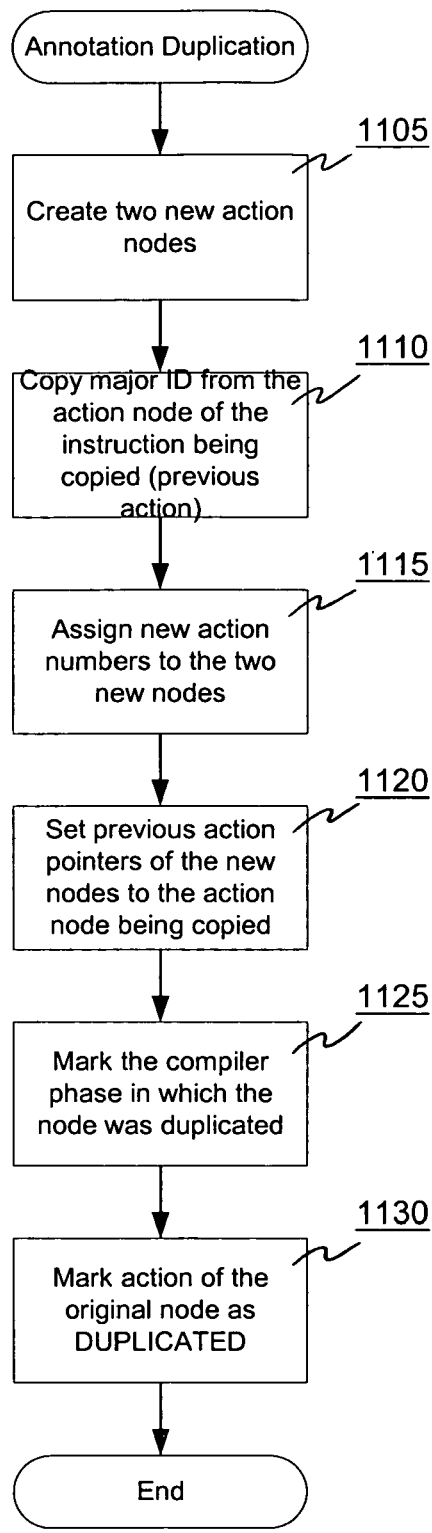
FIG. 11 is a flow chart illustrating annotation duplication according to one embodiment of the present invention.

FIG. 11 is a flow chart illustrating annotation duplication according to one embodiment of the present invention. First, two new action nodes are created 1105. The major ID is copied from the action node of the instruction being copied 1110 and a new action number is assigned to the two new nodes 1115. The previous action pointers of the two new nodes are set to the action node being copied 1120 and the compiler phase in which the node was duplicated is marked 1125. Finally, the action is marked as DUPLICATED. 1130.

Figure 12:
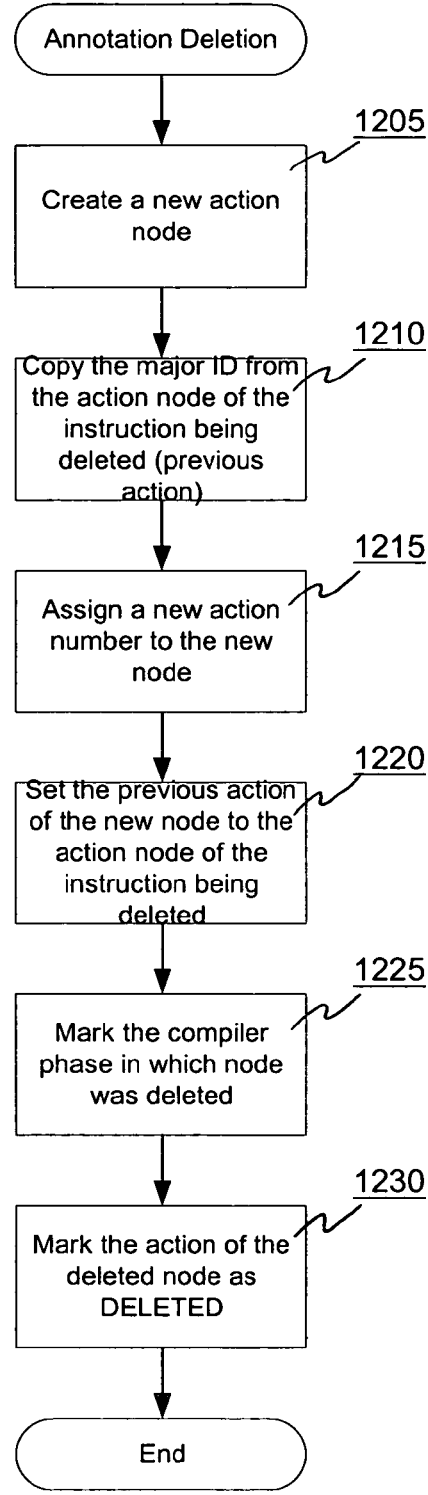
FIG. 12 is a flow chart illustrating annotation deletion according to one embodiment of the present invention.

FIG. 12 is a flow chart illustrating annotation deletion according to one embodiment of the present invention. First, a new action node is created 1205. The major ID is copied to the new node from the action node of the instruction being deleted 1210 and a new action number is assigned 1215. The previous action pointer of the new node is set to the action node of the instruction being deleted 1220 and the compiler phase in which the node was deleted is marked 1225. Finally, the action is marked as DELETED 1230.

Figure 13:
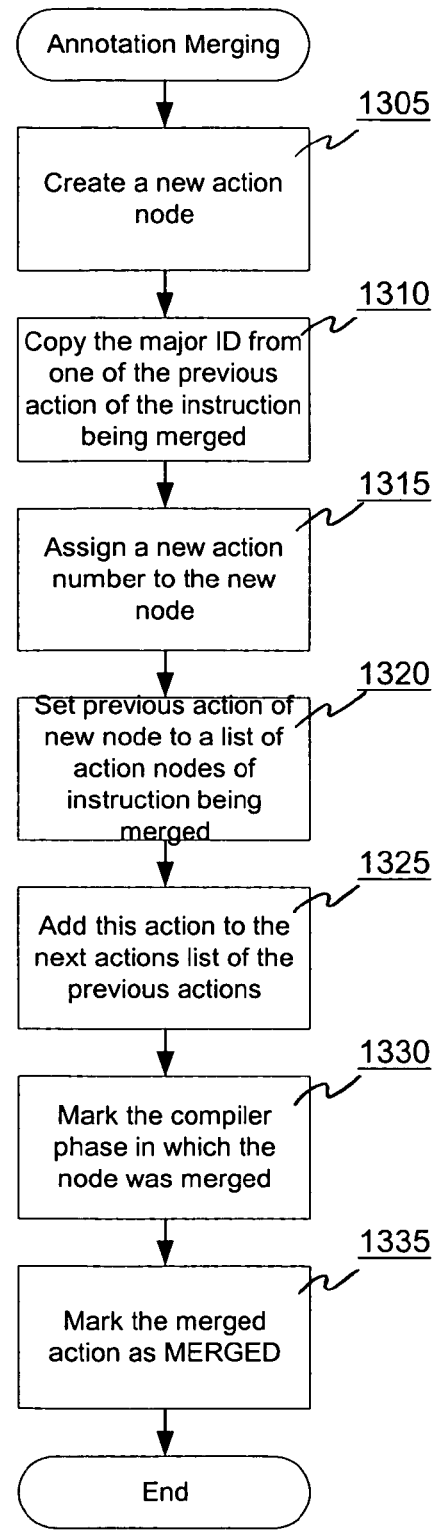
FIG. 13 is a flow chart illustrating annotation merging according to one embodiment of the present invention.

FIG. 13 is a flow chart illustrating annotation merging according to one embodiment of the present invention. First, a new action node is created 1305. The major ID from one of the previous action nodes of the instructions being merged is copied to the new action node 1310. A new action number is assigned to the new node 1315. Next, the previous actions pointer of the new node is set to a list of action nodes of the instructions being merged 1320. The new node is added to the next actions list of the previous nodes 1325 and the compiler phase in which the node was merged is marked 1330. Finally, the action is marked as MERGED 1335.

Figure 14:
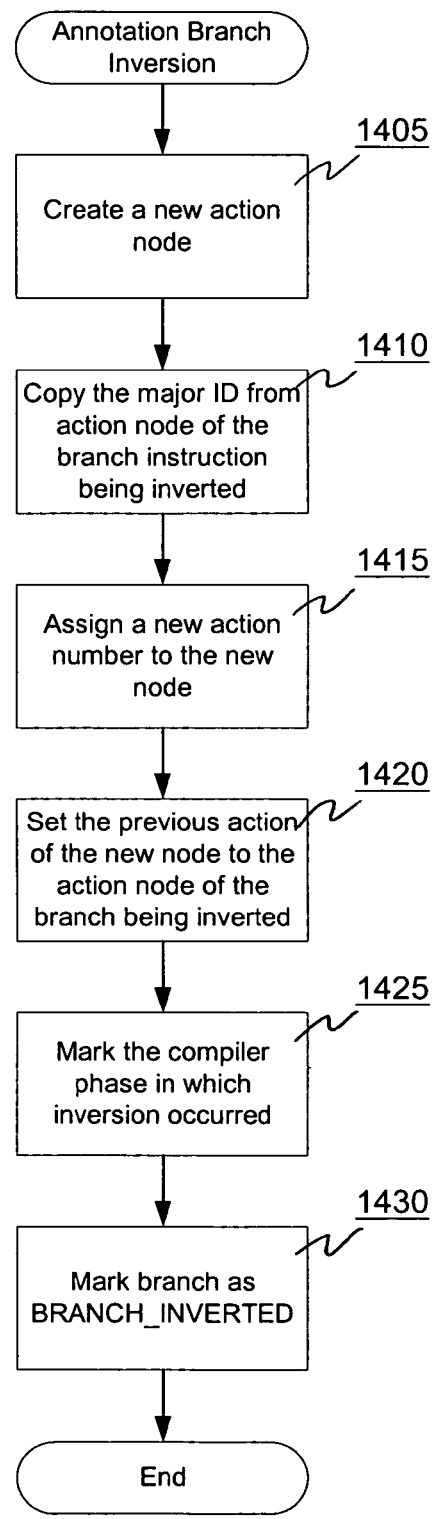
FIG. 14 is a flowchart illustrating annotation branch inversion according to one embodiment of the present invention.

FIG. 14 is a flowchart illustrating annotation branch inversion according to one embodiment of the present invention. First, a new action node is created 1405. The major ID from the action node of the branch being inverted is copied to the new action node 1410. A new action number is assigned to the new node 1415. Next, the previous actions pointer of the new node is set to the action node of the branch being inverted 1420 and the compiler phase in which the node was merged is marked 1425. Finally, the action is marked as BRANCH_INVERTED 1430.

The invention claimed is:

1. A method comprising:
   installing an intermediate representation on a target machine;
   generating and running executable code from the intermediate representation;
   collecting profile data including collecting details of a hardware configuration of the target machine and sampling the running of the executable code at a controlled rate;
   processing the profile data when a CPU of the target machine is idle; and
   recompiling the intermediate representation based on the processed profile data, wherein recompiling comprises using annotations to relate locations in the executable code to the profile data and the intermediate representation, wherein each annotation includes a compiler optimization phase in which the annotation was created.

2. The method of claim 1, wherein said processing the profile data comprises generating one or more profiles.

3. The method of claim 2, wherein said generating the one or more profiles comprises:
   generation of a binary level profile from analysis of the profile data; and
   derivation of a profile at high level intermediate language from the binary level profile.

4. The method of claim 1, wherein collecting the details of the hardware configuration of the target machine is performed during installing of the intermediate representation.

5. The method of claim 1, wherein the hardware configuration includes details of a processor type.

6. The method of claim 1, wherein the hardware configuration includes details of a cache configuration.

7. The method of claim 1, wherein said recompiling is performed by an operating system of the target machine.

8. The method of claim 1, wherein the annotations are implemented as a linked list of data structures.

9. The method of claim 1, wherein an annotation maps a binary level instruction to a source level token.

10. The method of claim 1, wherein an annotation describes how a binary level instruction evolved from a corresponding high level instruction in a prior compilation.

11. A computer readable medium having stored thereon data representing instructions that when executed cause a processor to:
   generate and run executable code from an intermediate representation installed on a target machine having the processor;

collect profile data including collecting details of a hardware configuration of the target machine and sampling the running of the executable code;

process the profile data; and recompile the intermediate representation based on the processed profile data, wherein recompiling comprises using annotations to relate locations in the executable code to the profile data and the intermediate representation, wherein each annotation includes a compiler optimization phase in which the annotation was created.

12. The computer readable medium of claim 11, wherein the data further comprises data representing instructions that when executed cause the processor to:

generate one or more profiles.

13. The computer readable medium of claim 11, wherein the data further comprises data representing instructions that when executed cause the processor to:

generate a binary level profile from analysis of the profile data; and derive a profile at high level intermediate language from the binary level profile.

14. The computer readable medium of claim 11, wherein collecting the details of the hardware configuration of the target machine is performed during installing of the intermediate representation.

15. The computer readable medium of claim 11, wherein the hardware configuration includes details of a processor type.

16. The method of claim 11, wherein said recompiling ling is performed by an operating system of the target machine.

17. The method of claim 11, wherein the annotations are implemented as a linked list of data structures.

18. A computer system comprising:

a bus;

a communication device coupled with the bus, a processor coupled with the bus;

a memory coupled with the bus, and data stored in the memory that represent instructions that when executed cause a processor to:

generate and run executable code from an intermediate representation installed on the computer system;

collect profile data including collecting details of a hardware configuration of the computer system and sampling the running of the executable code at a controlled rate;

process the profile data when the processor is idle; and recompile the intermediate representation based on the processed profile data, wherein recompiling comprises using annotations to relate locations in the executable code to the profile data and the intermediate representation, wherein each annotation includes a compiler optimization phase in which the annotation was created.

19. The computer system of claim 18, wherein the data further comprises data representing instructions that when executed cause the processor to:

generate one or more profiles.

20. The computer system of claim 19, wherein the data further comprises data representing instructions that when executed cause the processor to:

generate a binary level profile from analysis of the profile data; and derive a profile at high level intermediate language from the binary level profile.

21. The computer system of claim 18, wherein the data further comprises data representing instructions that when executed cause the processor to:

create an annotation.

* * * * *